United States Patent [19]
Butler

[11] Patent Number: 5,266,741
[45] Date of Patent: Nov. 30, 1993

[54] UNITARY CABLE CLOSURE

[76] Inventor: David O. Butler, 1306 Vermont Ave., Tarpon Springs, Fla. 34689

[21] Appl. No.: 869,497

[22] Filed: Apr. 16, 1992

Related U.S. Application Data

[63] Continuation-in-part of Ser. No. 791,968, Nov. 13, 1991.

[51] Int. Cl.⁵ .......................................... H02G 15/113
[52] U.S. Cl. ........................................ 174/92; 174/41; 174/70 A; 174/93
[58] Field of Search .................. 174/92, 93, 41, 70 A

[56] References Cited

U.S. PATENT DOCUMENTS

| | | | |
|---|---|---|---|
| 3,992,569 | 11/1976 | Hankins et al. | 174/92 |
| 4,390,744 | 6/1983 | Suffi et al. | 174/41 |
| 4,535,197 | 8/1985 | Butler | 174/41 |
| 4,536,611 | 8/1985 | Butler | 174/41 |
| 4,605,815 | 8/1986 | Wilson | 174/41 |
| 4,647,715 | 3/1987 | Butler | 174/41 |
| 4,694,118 | 9/1987 | Schmidt | 174/41 |
| 4,994,630 | 2/1991 | Schilling | 174/41 |

Primary Examiner—Morris H. Nimmo
Attorney, Agent, or Firm—Stanley M. Miller

[57] ABSTRACT

A unitary cable closure for telecommunication cables includes a tubular housing having a seamless top that provides a weather-tight enclosure for telecommunication cable splices and repair openings. The closure is hinged along a top edge so that its bottom edges can be swung open to expose the interior of the closure. The closure is suspended from a support strand by hanger brackets that are also of hinged construction so that the closure can be opened along its hinges without obstruction. The hanger brackets are adapted to permit adjustment of the vertical spacing between the closure and the support strand. The opposing bottom edges of the closure are permanently interlocked in a first embodiment and releasably interlocked in a second. The opposite ends of the closure may be cut off to adapt it to cables of progressively larger diameter and to adapt it to receive a second cable as well. The closure includes a termination port through which access to the cable conductors can be obtained. The closure also includes a cover plate which encloses the termination port. In one embodiment of the closure for termination between the cable and a subscriber, the cover plate can be removed and a terminal block panel having a lid removably mounted within the closure may be releasably suspended from the closure by its lid when service work is being performed. In a second terminal embodiment of the closure the terminal block panel attaches directly below the termination port allowing access to the cable when service work is being performed and at the completion of the work the cover plate can be reattached.

28 Claims, 14 Drawing Sheets

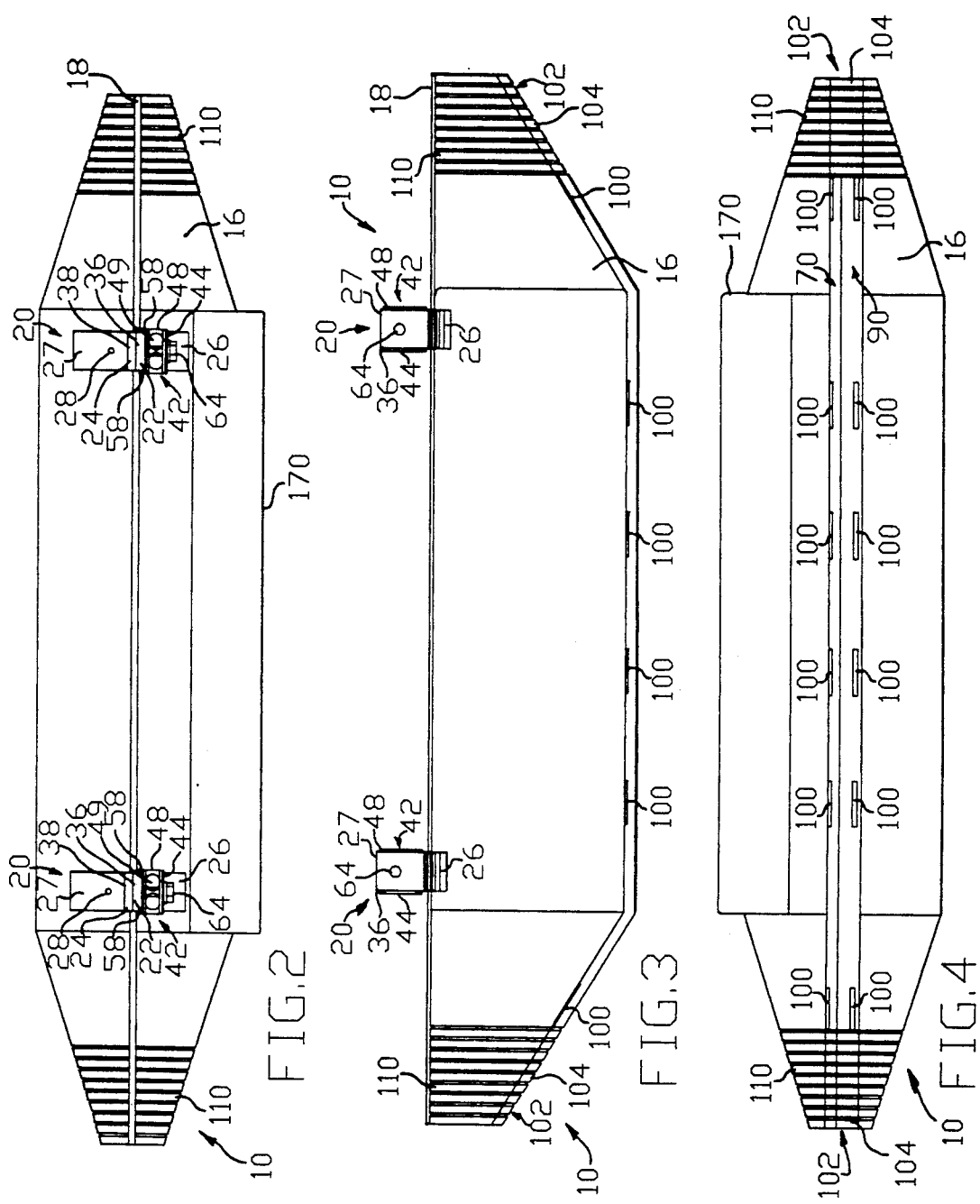

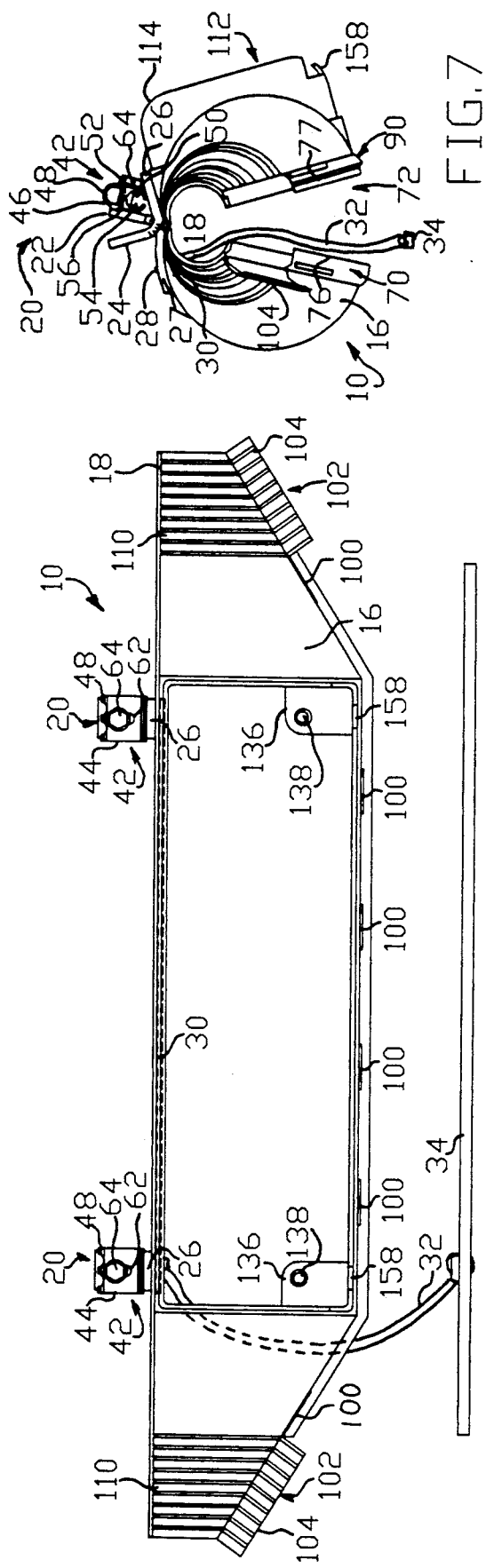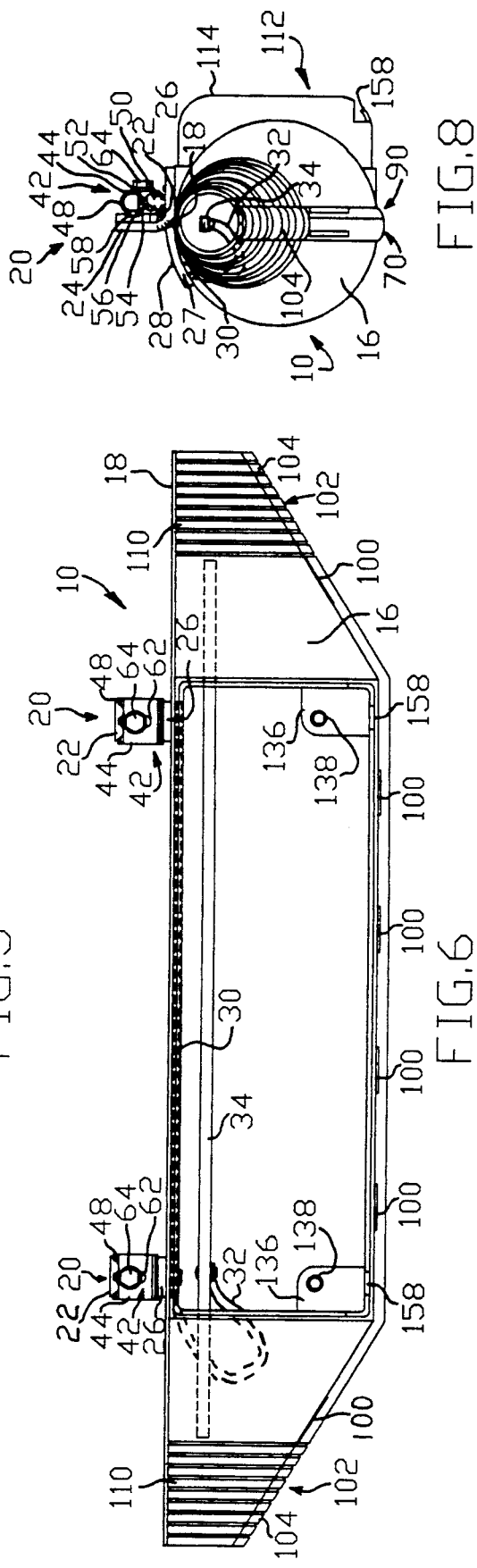

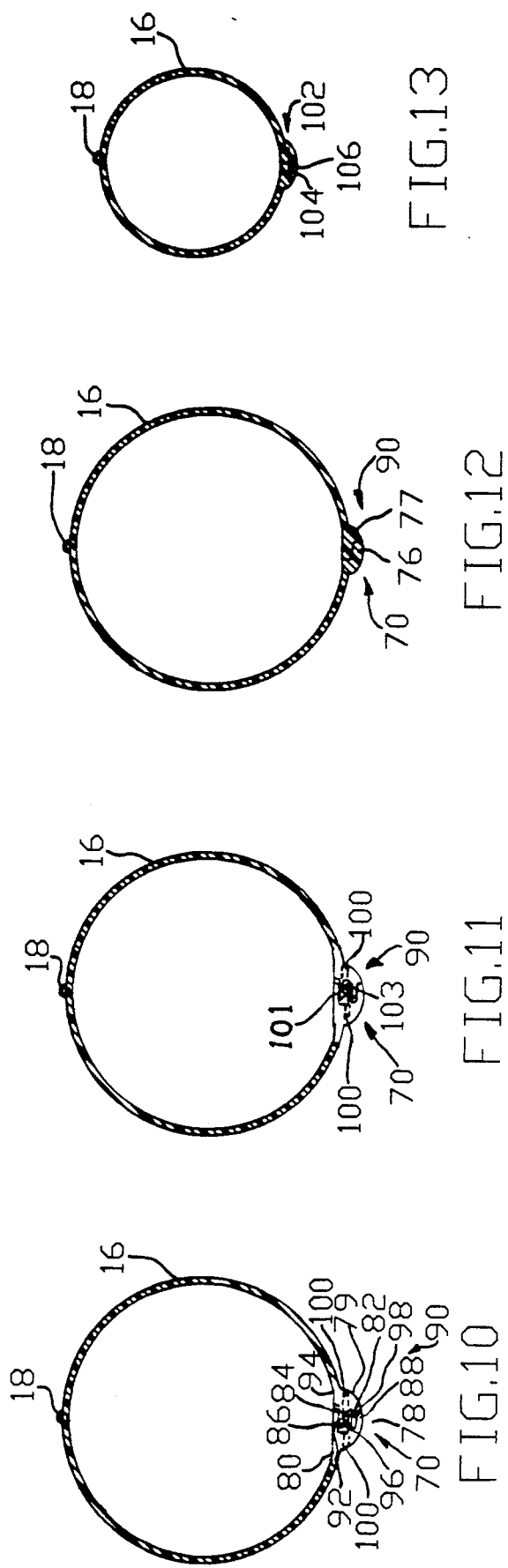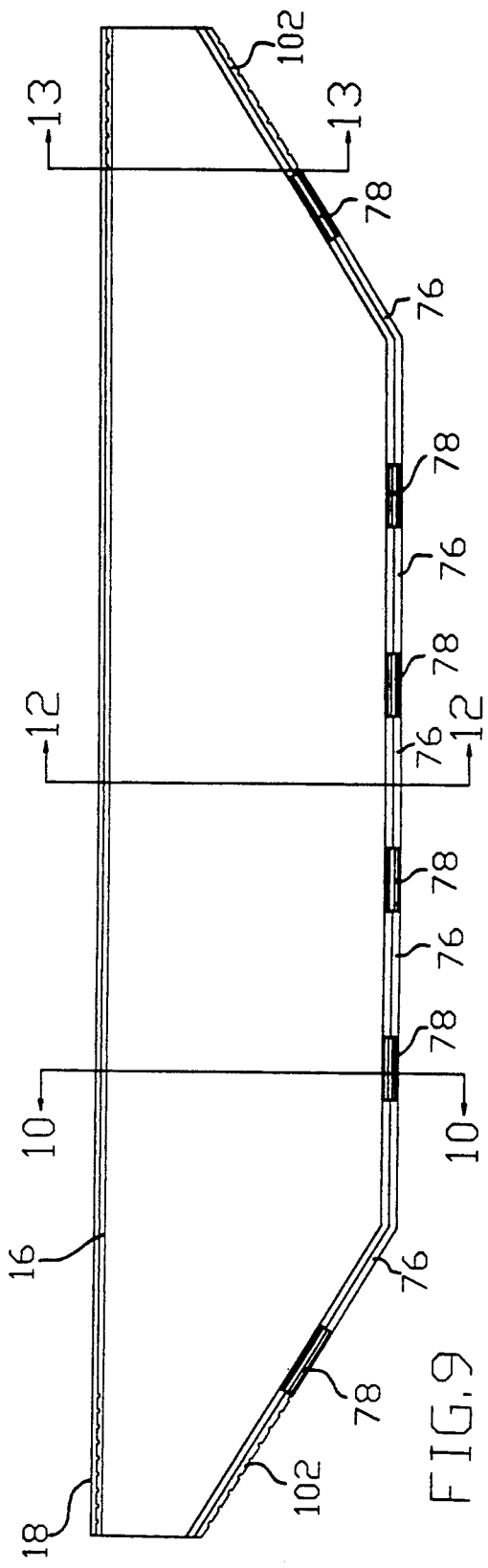

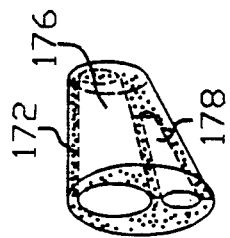
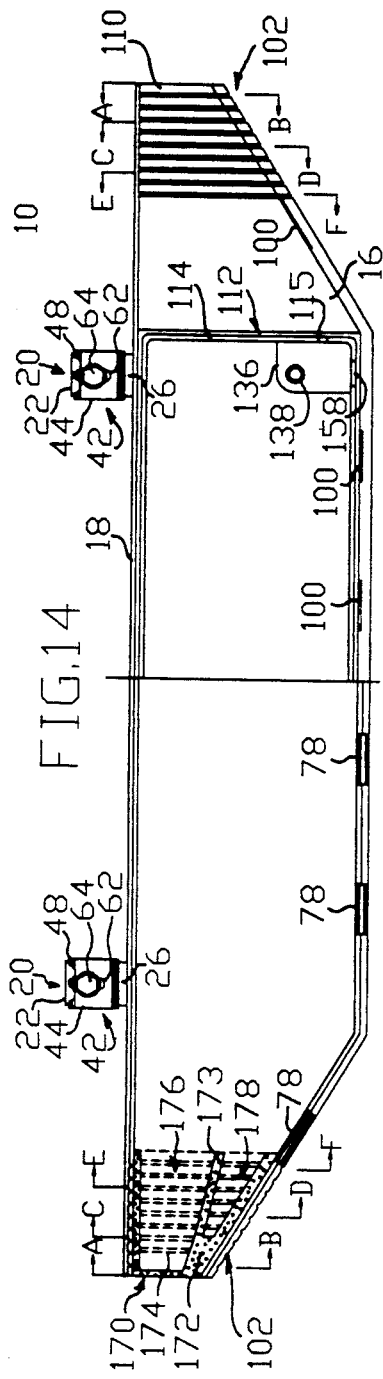
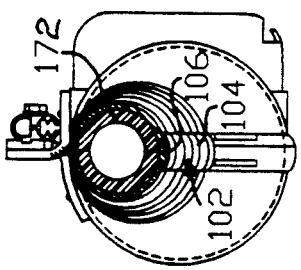
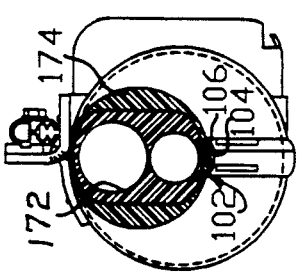
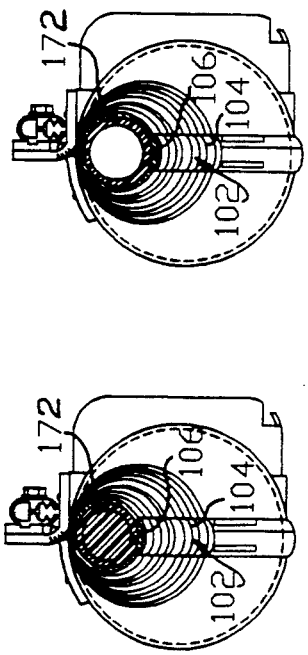
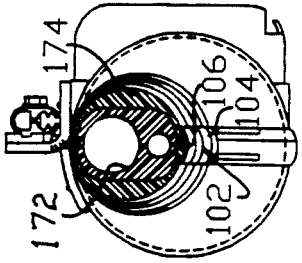

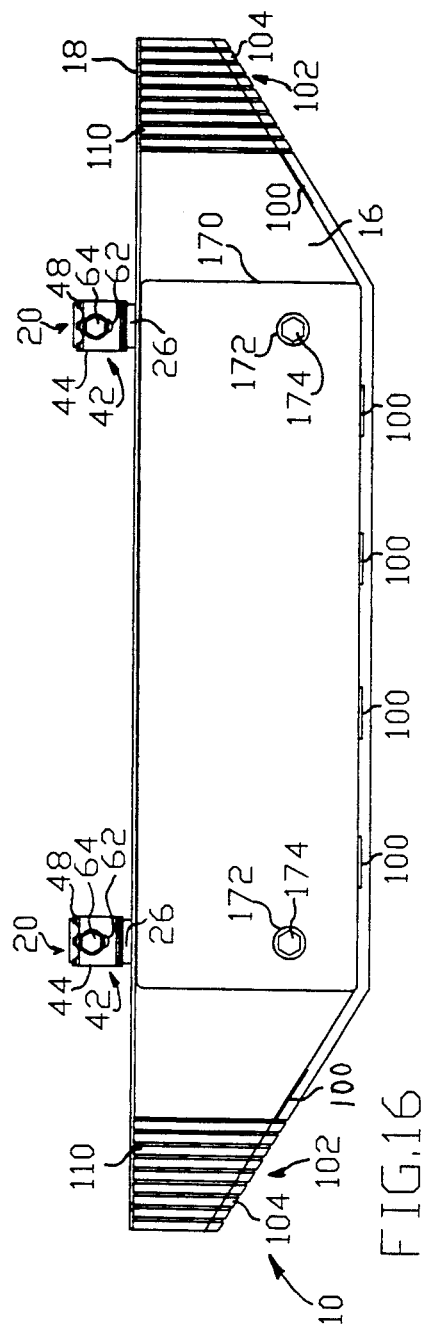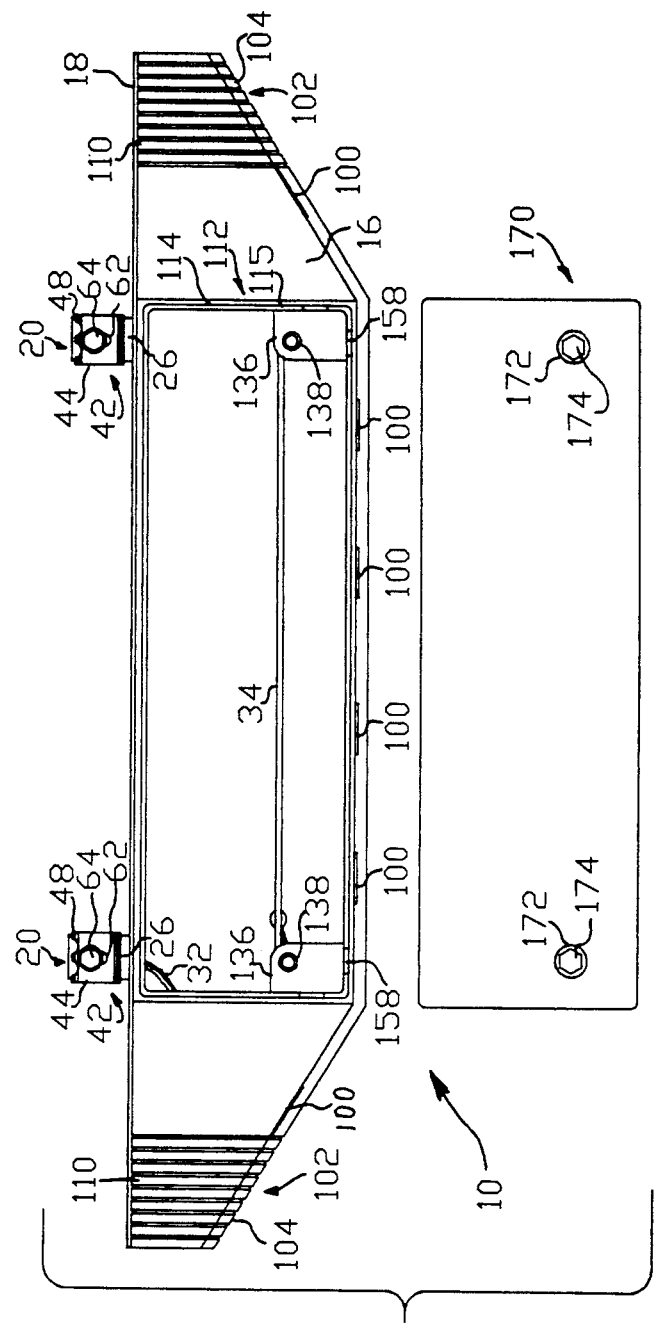

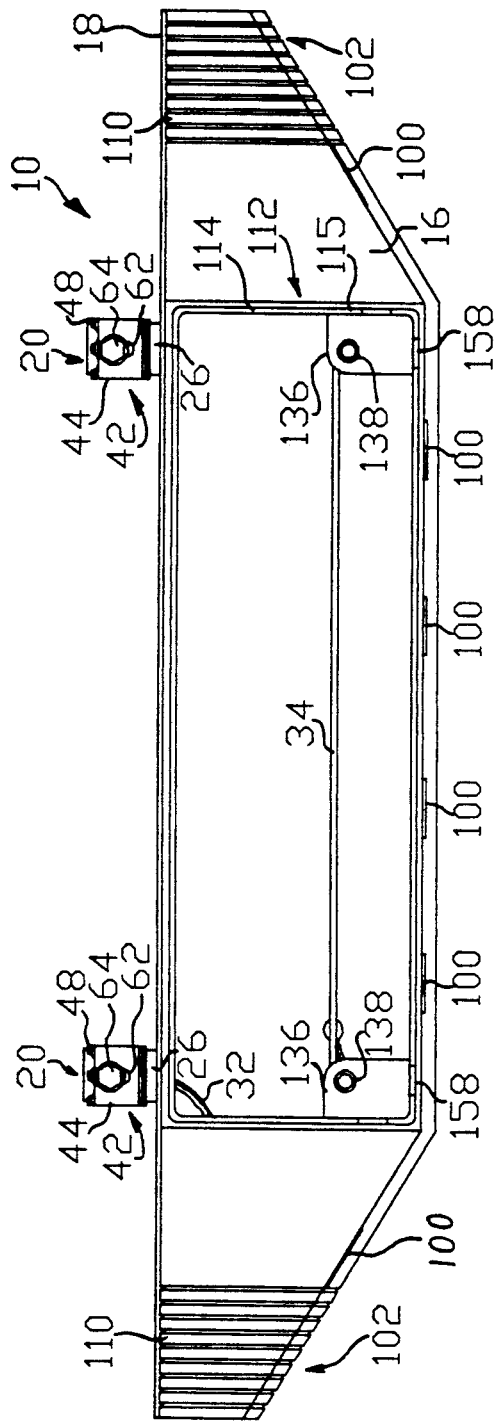
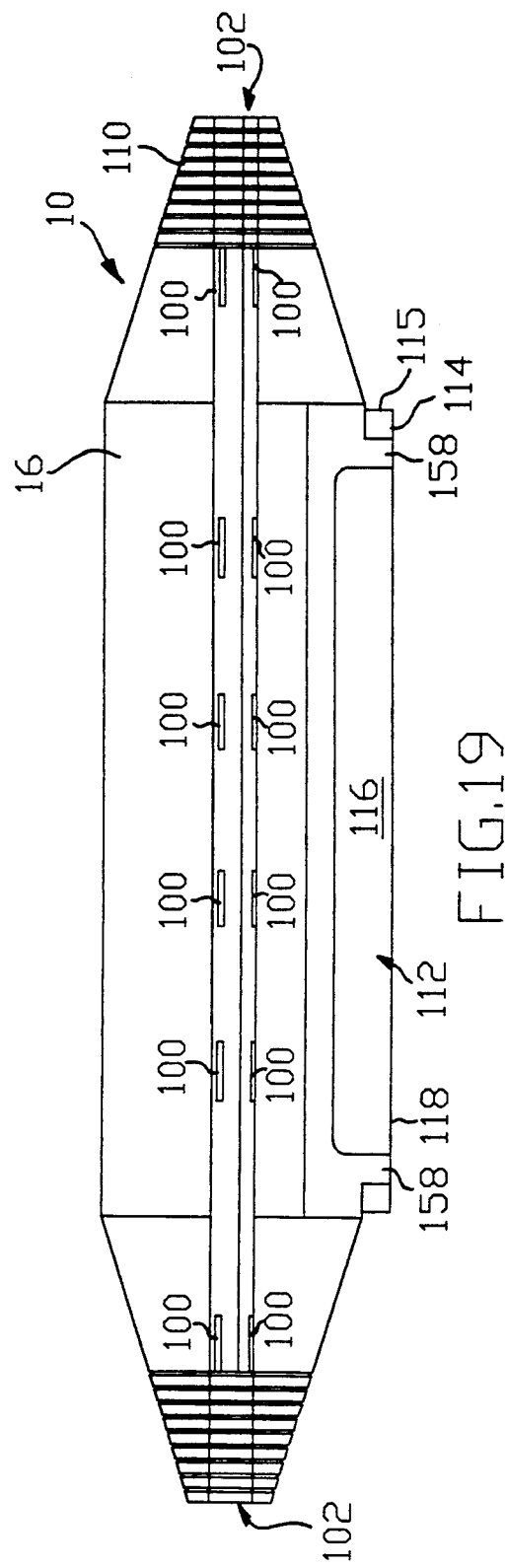
FIG.18
FIG.19

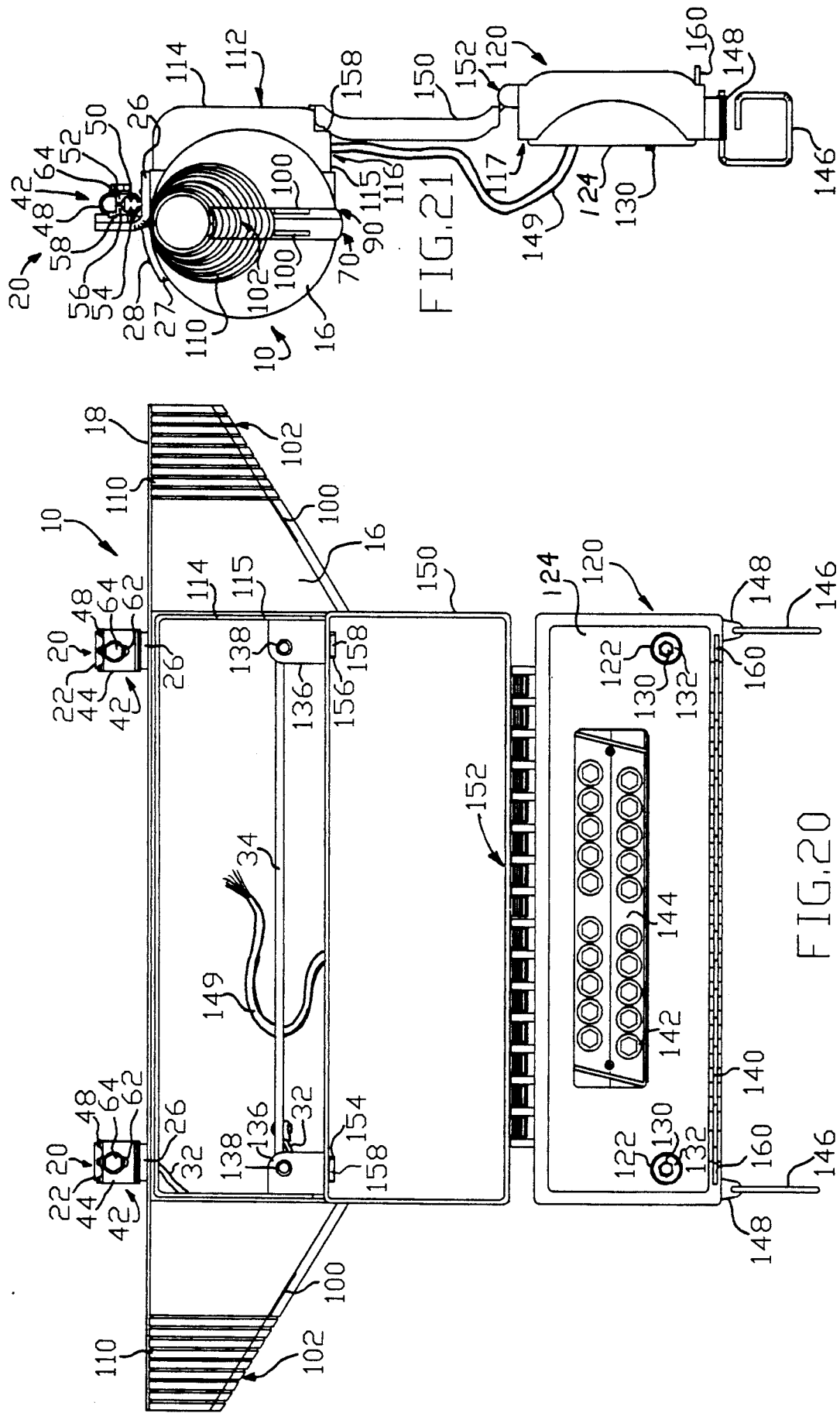

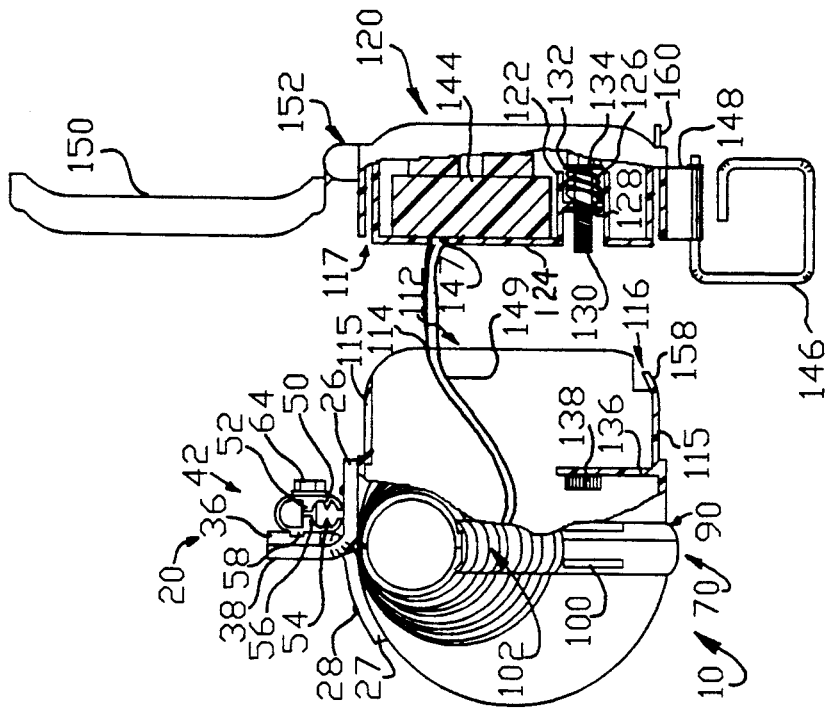

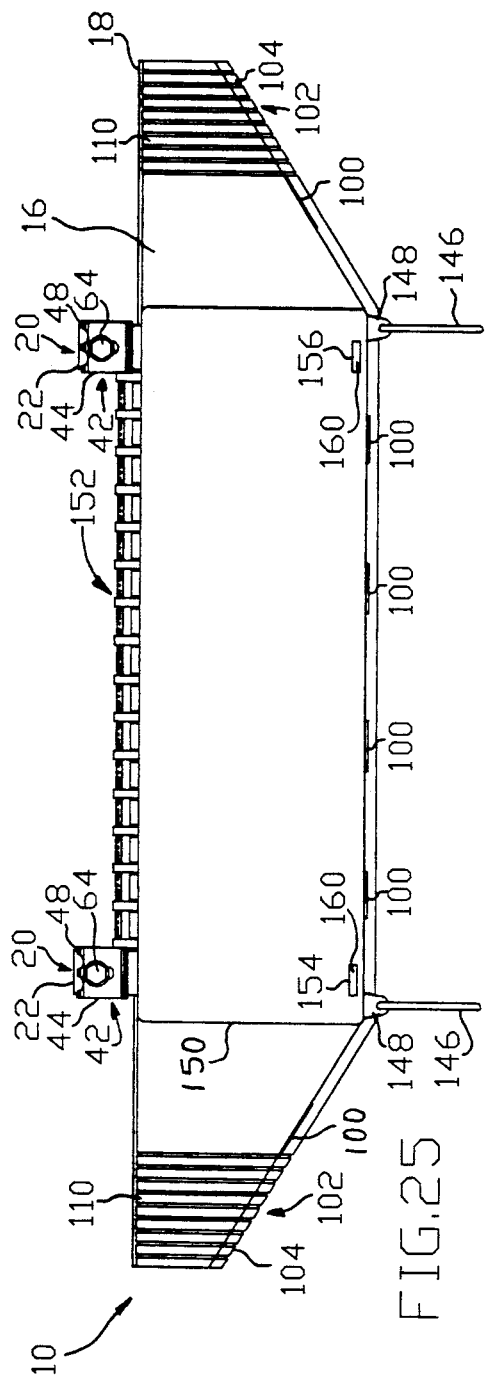
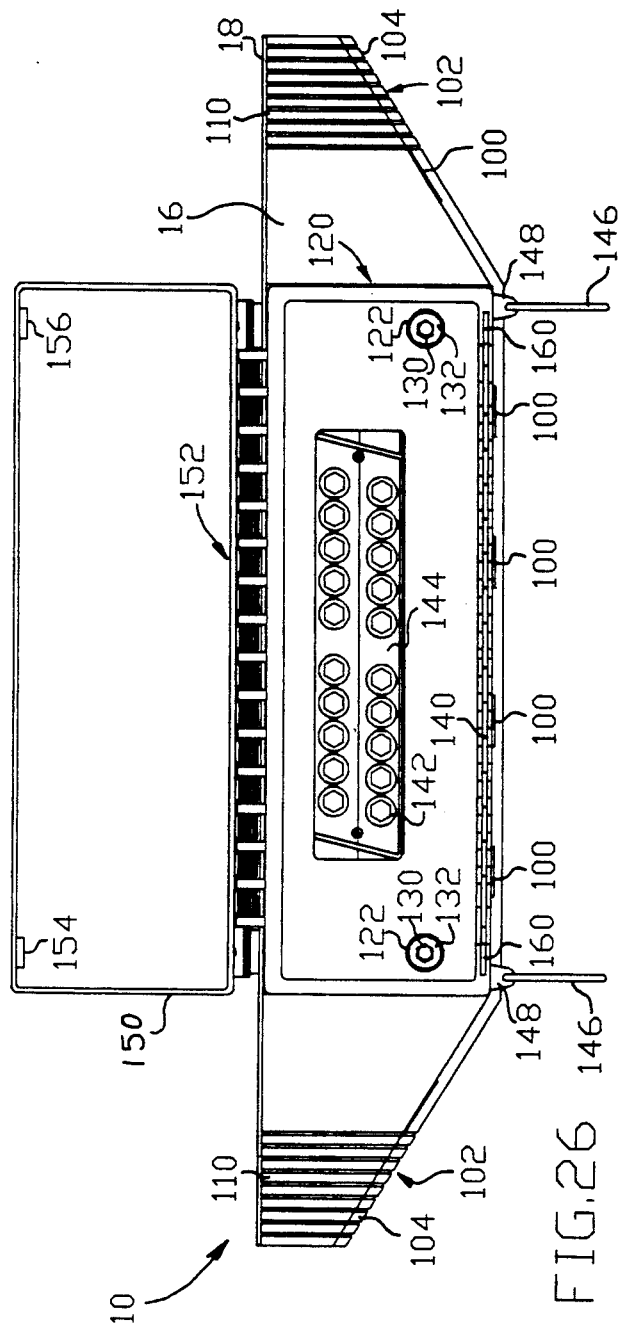

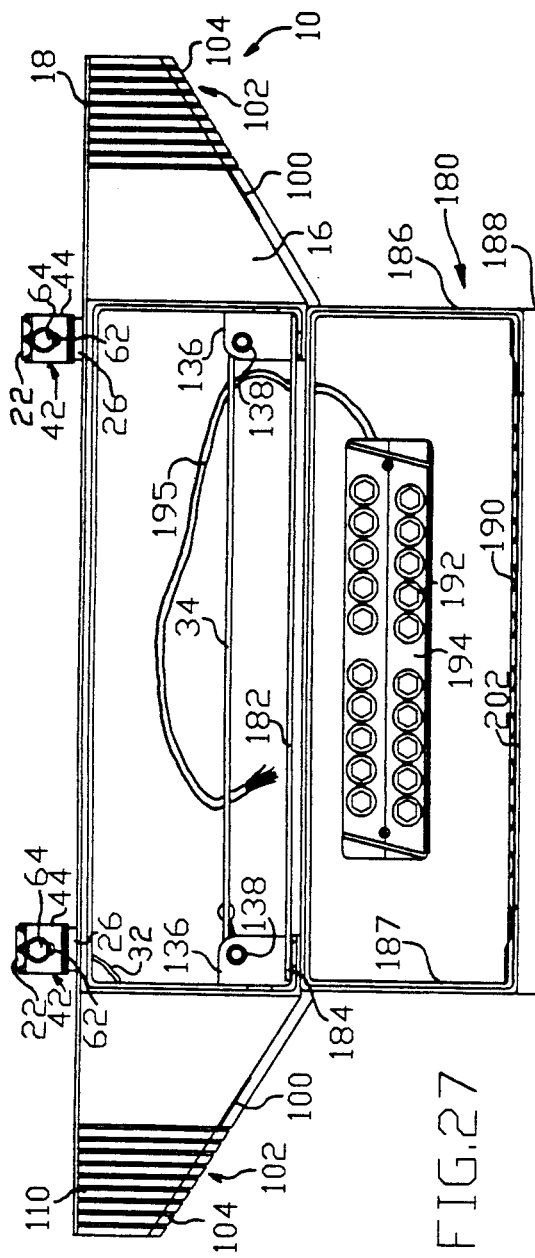
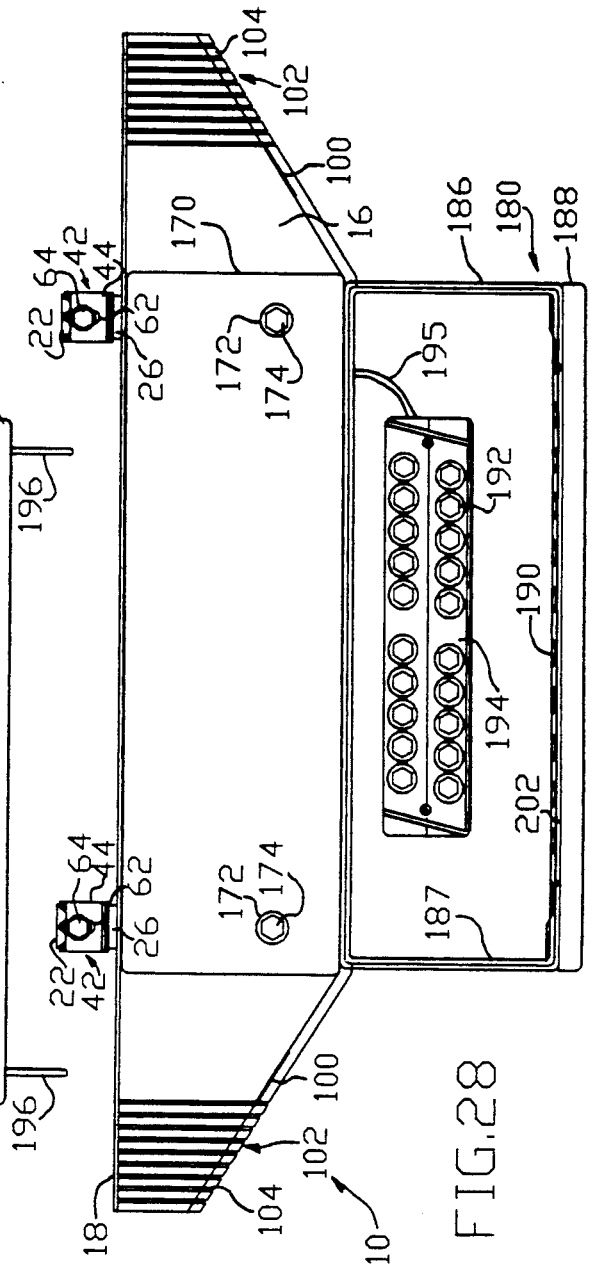

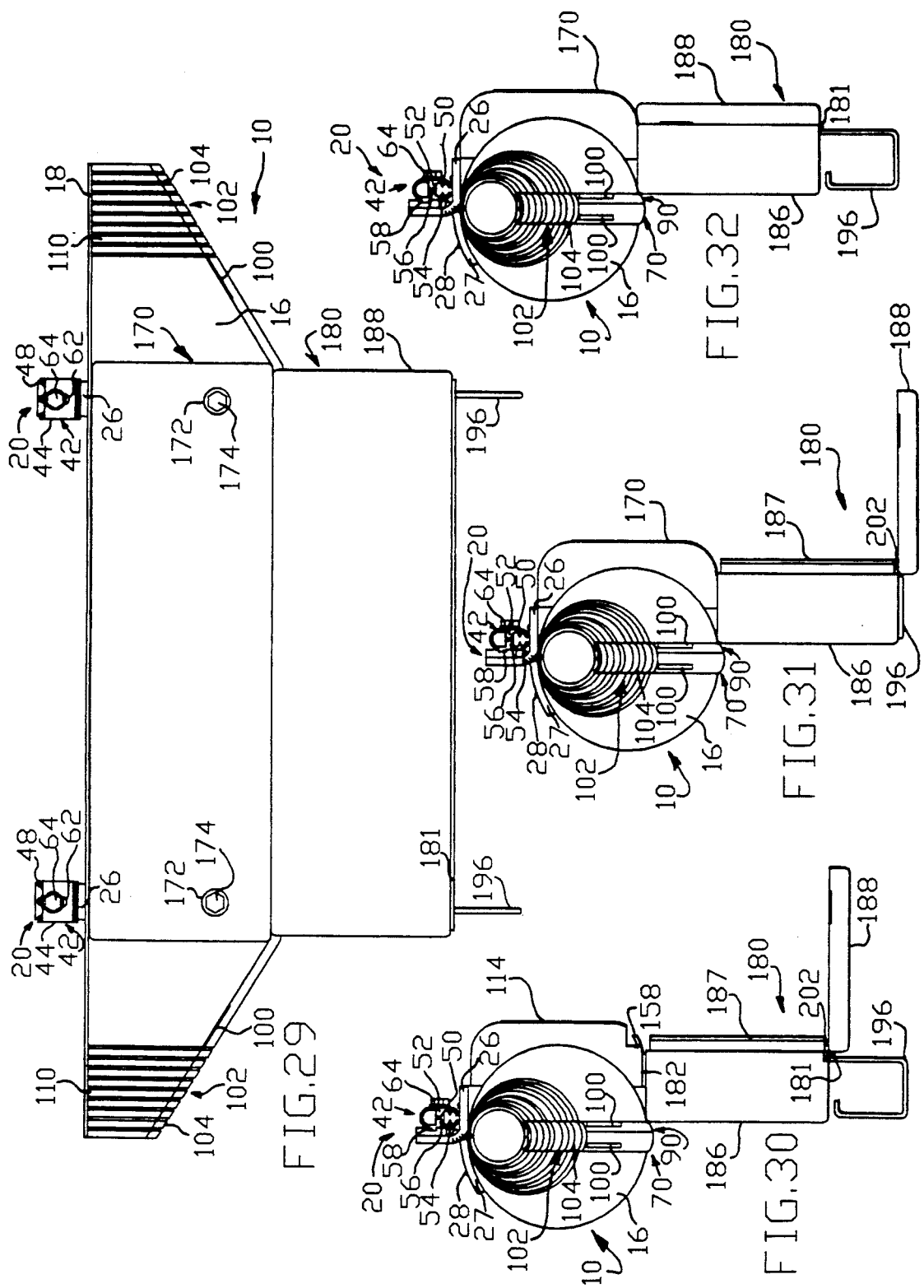

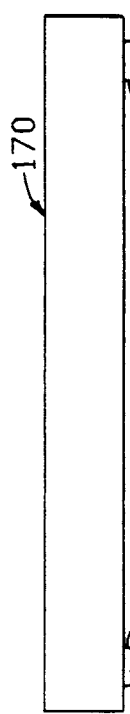
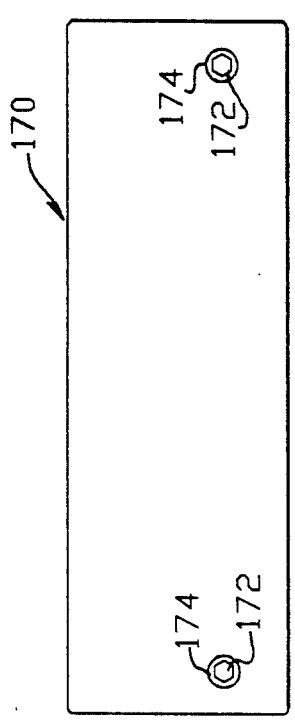
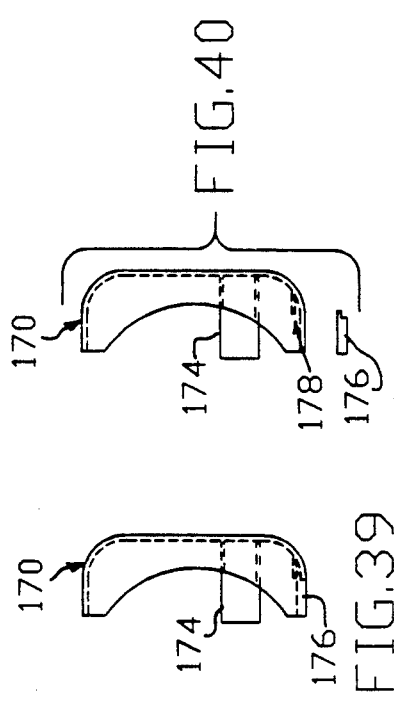
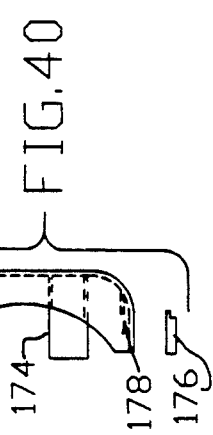
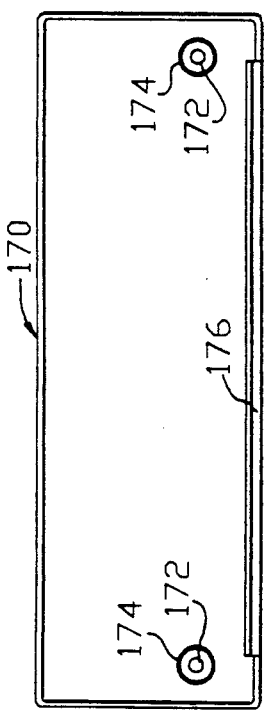
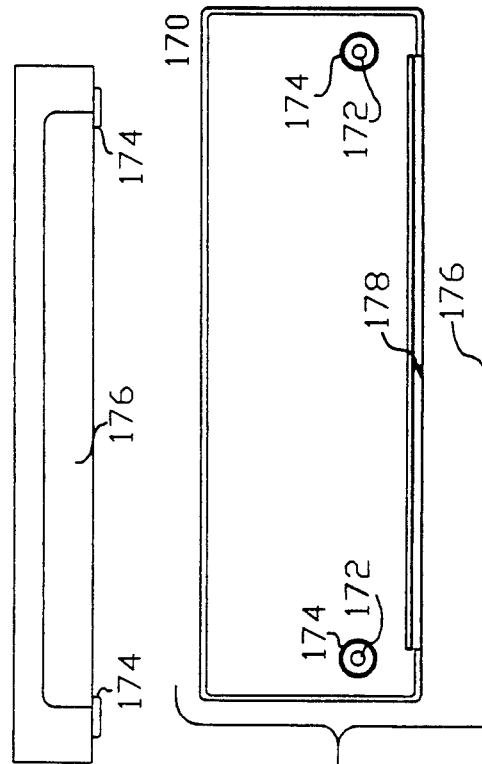
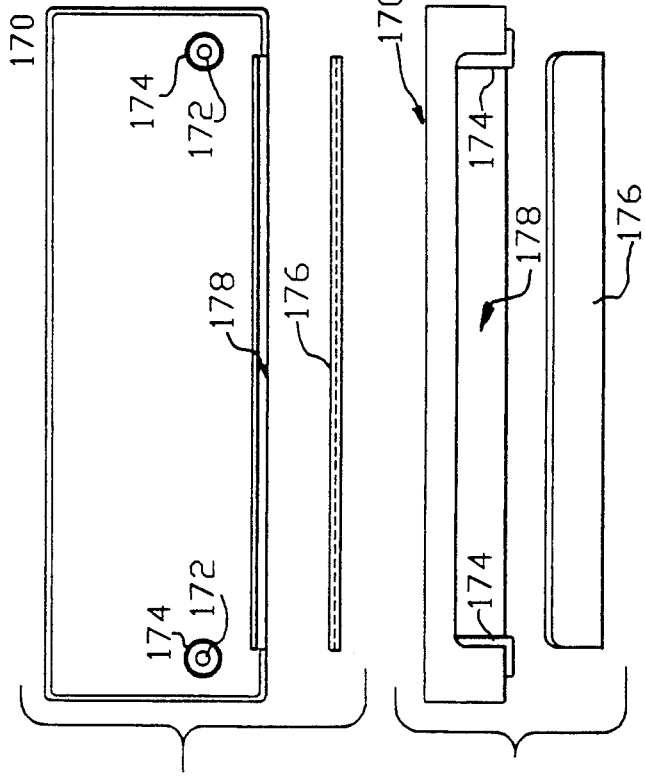
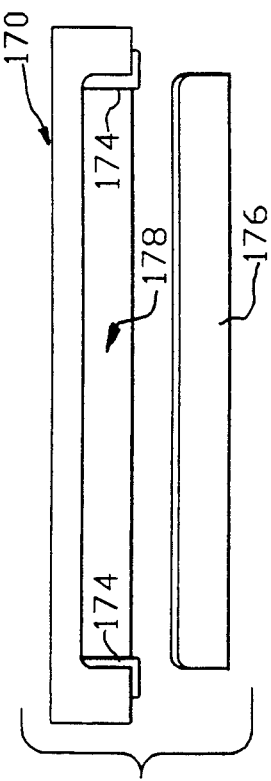

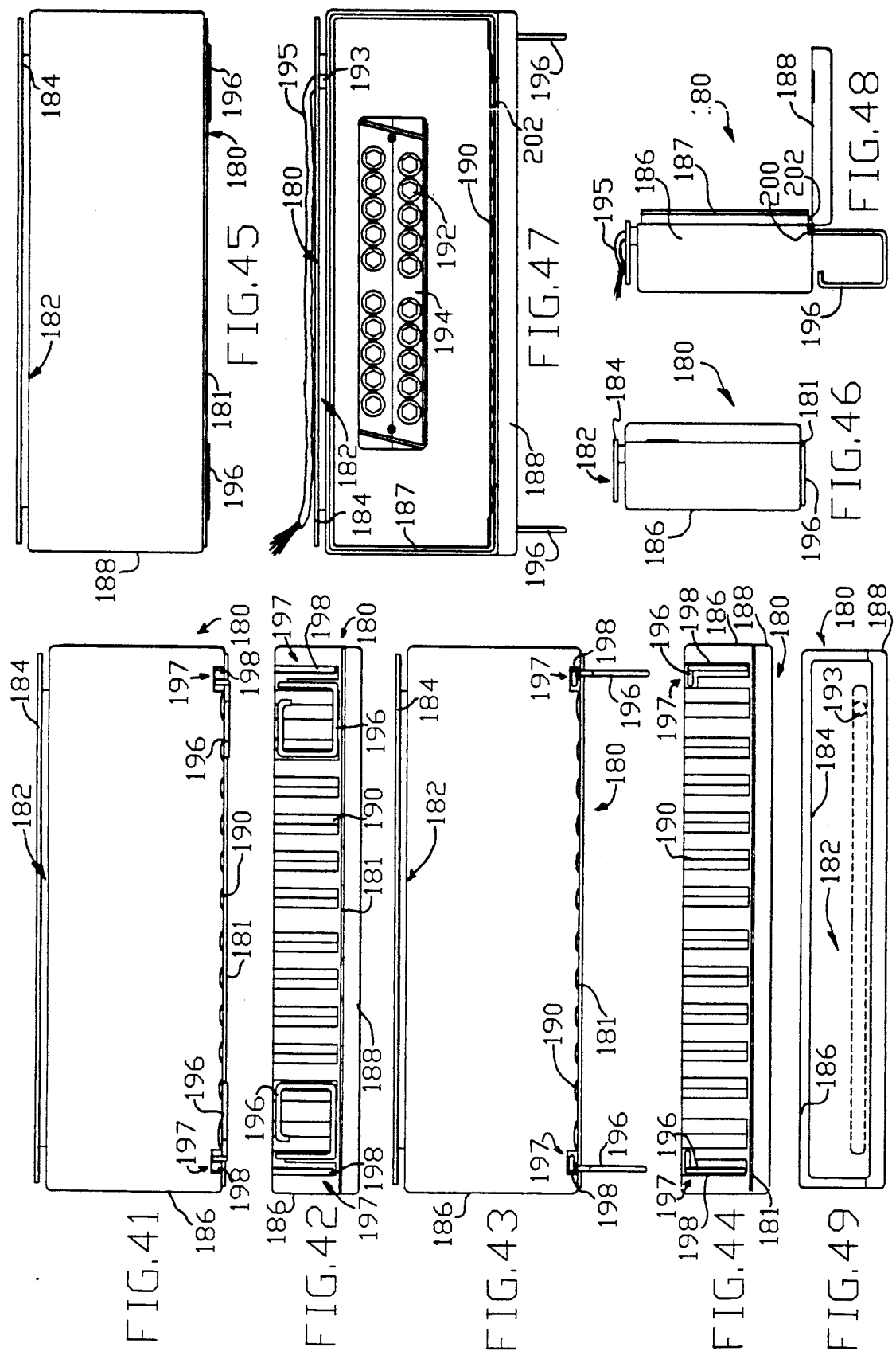

UNITARY CABLE CLOSURE

The invention is a continuation-in part of patent application Ser. No. 791,968, filed Nov. 13, 1991.

BACKGROUND OF THE INVENTION

1. Field of the Invention

This invention relates, generally, to housings for communication cables. More particularly, it relates to a one piece, self-contained device that performs a multiplicity of functions.

2. Description of the Prior Art

Communication cables such as telephone cables are typically supported on utility poles. As in all electrical installations involving intersecting lines, junction boxes are needed where cables meet. For example, where service lines extend from the main cable to customers' houses, a connection is needed between the main cable and the service lines. Junction boxes have long been provided to protect junctions from the elements and to facilitate the work of those who make and maintain the junctions.

Early junction boxes were simple boxes and nothing more. In the telephone industry, the junction boxes have become known as cable closures; generally, they are carried by the same support strand that supports the cable. As cable closures have developed, better and better designs have appeared; some closures are especially designed to prevent entry thereinto by craft-personnel designing to tamper inappropriately with the conductors in the cable. For example, where one pair of conductors is defective, instead of finding and repairing the defect, the craft person might inappropriately change the service wire connection to another pair of conductors which were not intended for use in that particular closure; thus, securely closing the cable closure ensures that the craft person will be forced to find and repair the defective conductors without resorting to an expedient solution that might create additional problems. Some are designed primarily to seal the contents thereof from the effects of the elements, insects, and so on. Some designs are inadequate to perform all of their intended functions, and must be used in connection with auxiliary pieces of equipment. The art has failed to produce a cable closure that performs all of the functions and more in a single unitary construction that does not require augmentation.

The most advanced cable closure heretofore known was invented by the present inventor and is disclosed in U.S. Pat. No. 4,535,197 awarded Aug. 13, 1985. That patent includes a further disclosure of prior art developments in this field, and that disclosure is incorporated hereinto by reference.

SUMMARY OF THE INVENTION

The present invention includes a generally tubular housing made of two parts that are hingedly connected to one another along a top edge thereof. A pair of unique brackets, each of which also has a hinged construction, interconnect the support strand and the novel housing without interfering with the hinged interconnection of the two parts of the housing. The bottom edges of the two parts are tightly interlockable; no adhesive or sealant is required to supplement the weathertight seal provided when the two parts engage one another.

The main body of the cable closure is tubular, but the opposite ends thereof taper downwardly in diameter to match the diameter of the incoming cable. However, a highly novel feature of the cable closure enables it to be modified as needed to accommodate cables of differing diameter, and to even accommodate a pair of incoming cables. More particularly, a plurality of eccentric rings are formed about the tapered opposite ends of the closure, and the closure may be cut at each ring. Each ring has an internal partition wall associated with it, so that the end of the closure remains sealed as each ring is cut. Moreover, a pair of cable-receiving passageways is provided in each end as well, and both passageways are exposed if a predetermined number of rings is cut off; this enables the closure to accept two incoming cables.

Further advances in the art include a termination port and cover plate. Removal of the cover plate exposes the termination port to enable facile connection of the cable to a service wire of the type running to a telephone customer's house. The termination port is formed in the side of the tubular housing and includes a rectangular frame.

Still further advances in the art include a first and second terminal embodiment of the invention, the first such embodiment including a terminal block panel and cover which is housed within the termination port and which may be swung outward therefrom when service changes are needed, and a means for mounting the terminal panel in a position that enables the person performing the service work to use both hands. The second such embodiment includes a terminal block panel and cover which attaches to the closure below the termination port and includes lock-down drop hangers which hold the optimum drop hanger position for service drops and resist swinging out of position.

In one embodiment of the novel closure, its locking means is designed so that it may not be reopened by unauthorized personnel after it has been closed. In another embodiment, the locking means permits reopening.

The primary object of the present invention is to provide a revolutionary cable closure that represents the culmination of developments in this field.

A more specific object is to provide a self-contained unitary cable closure that performs all of the needed functions in the absence of auxiliary equipment.

These and many other objects, features, and advantages of the invention will become apparent as this description proceeds.

The invention accordingly comprises the features of construction, arrangement of parts, and combination of elements that will be hereinafter set forth, and the scope of the invention will be indicated in the claims.

BRIEF DESCRIPTION OF THE DRAWINGS

For a fuller understanding of the nature, objects, and scope of the invention, reference should be made to the following detailed description, taken in connection with the accompanying drawings in which:

FIG. 2 is a top plan view of the embodiment shown in FIG. 1;

FIG. 3 is a rear elevational view thereof;

FIG. 4 is a bottom plan view thereof;

FIG. 5 is a side elevational view of the closure when it is open at its bottom edge and a cable bonding means is positioned externally thereof;

FIG. 6 is a side elevational view of the closure when it has closed and the cable bonding means is in its operative position;

FIG. 7 is an end view of the apparatus shown in FIG. 5;

FIG. 8 is an end view of the apparatus shown in FIG. 6;

FIG. 9 is a longitudinal sectional view of the novel closure;

FIG. 10 is a transverse sectional view taken along line 10—10 in FIG. 9;

FIG. 11 is a transverse sectional view of a second embodiment of the parts shown in FIG. 10;

FIG. 12 is a transverse sectional view taken along line 12—12 in FIG. 9;

FIG. 13 is a transverse sectional view taken along line 13—13 in FIG. 9;

FIG. 14 is a side elevational, partly cut away view showing the integral end seal of the novel closure; FIG. 14A is a transverse sectional view taken along line 14A—14A in FIG. 14;

FIG. 14B is a sectional view taken along line 14B—14B in FIG. 14;

FIG. 14C is a sectional view taken along line 14C—14C in FIG. 14;

FIG. 14D is a sectional view taken along line 14D—14D in FIG. 14;

FIG. 14E is a sectional view taken along line 14E—14E in FIG. 14;

FIG. 14F is a sectional view taken along line 14F—14F in FIG. 14;

FIG. 15 is a perspective view of the novel integral end seal;

FIG. 16 is a side elevation view of the closure;

FIG. 17 is a side elevation view of the closure with the cover plate removed exposing the termination port;

FIG. 18 is a side elevational view of the novel closure having a termination port;

FIG. 19 is a bottom plan view of the closure shown in FIG. 18;

FIG. 20 is a side elevational view of the closure shown in FIG. 18 in its first terminal embodiment when a novel terminal block panel is suspended therefrom by its cover;

FIG. 21 is a side elevational view of the novel closure shown in FIG. 20;

FIG. 22 is a side elevational view of the closure shown in FIG. 20 with the terminal block panel inserted into the closure and with the cover closed;

FIG. 23 is a fragmentary, side elevational view of the novel closure in FIG. 20 with its cover open;

FIG. 24 is a fragmentary, side elevational view of the closure in FIG. 20 with its terminal block panel removed;

FIG. 25 is a front elevational view of the closure shown in FIG. 20 with the cover open;

FIG. 26 is a front elevational view of the closure shown in FIG. 20 with the cover closed to conceal the terminal block panel;

FIG. 27 is a side elevation view of the closure shown in FIG. 18 in its second terminal embodiment when a novel terminal block panel is suspended therefrom by its upwardly projecting flange and with the cover plate removed;

FIG. 28 is a side elevation view of the closure shown in FIG. 27 with the cover plate installed and the terminal panel cover in its open position;

FIG. 29 is a side view of the closure shown in FIG. 28 with its terminal panel cover closed;

FIG. 30 is an end view of the closure shown in FIG. 27;

FIG. 31 is an end view of the closure shown in FIG. 28;

FIG. 32 is an end view of the closure shown in FIG. 29;

FIG. 33 is an inside view of the cover plate with the drop slot insert in place;

FIG. 34 is a bottom elevation view of the cover plate shown in FIG. 33;

FIG. 35 is an inside view of the cover plate with the drop slot insert removed;

FIG. 36 is a bottom elevation view of the cover plate shown in FIG. 35;

FIG. 37 is an outside view of the cover plate;

FIG. 38 is a top view of the cover plate;

FIG. 39 is a side view of the cover plate as shown in FIG. 33;

FIG. 40 is a side view of the cover plate as shown in FIG. 35;

FIG. 41 is a back view of the terminal block panel shown in FIG. 27 with the lock-down drop hanger in its stored position;

FIG. 42 is a bottom view of the termination block panel shown in FIG. 41;

FIG. 43 is a rear view of the terminal block panel in its stationary position;

FIG. 44 is a bottom view of the termination block panel shown in FIG. 43;

FIG. 45 is a front view of the termination block panel with its cover in its closed position;

FIG. 46 is an end view of the termination block shown in FIG. 45;

FIG. 47 is a front view of the termination block with its cover in its open position;

FIG. 48 is an end view of the termination block shown in FIG. 47; and

FIG. 49 is a top view of the of the termination block panel shown in FIG. 45;

Similar reference numerals refer to similar parts throughout the several views of the drawings.

DETAILED DESCRIPTION OF THE PREFERRED EMBODIMENT

Figure 1:
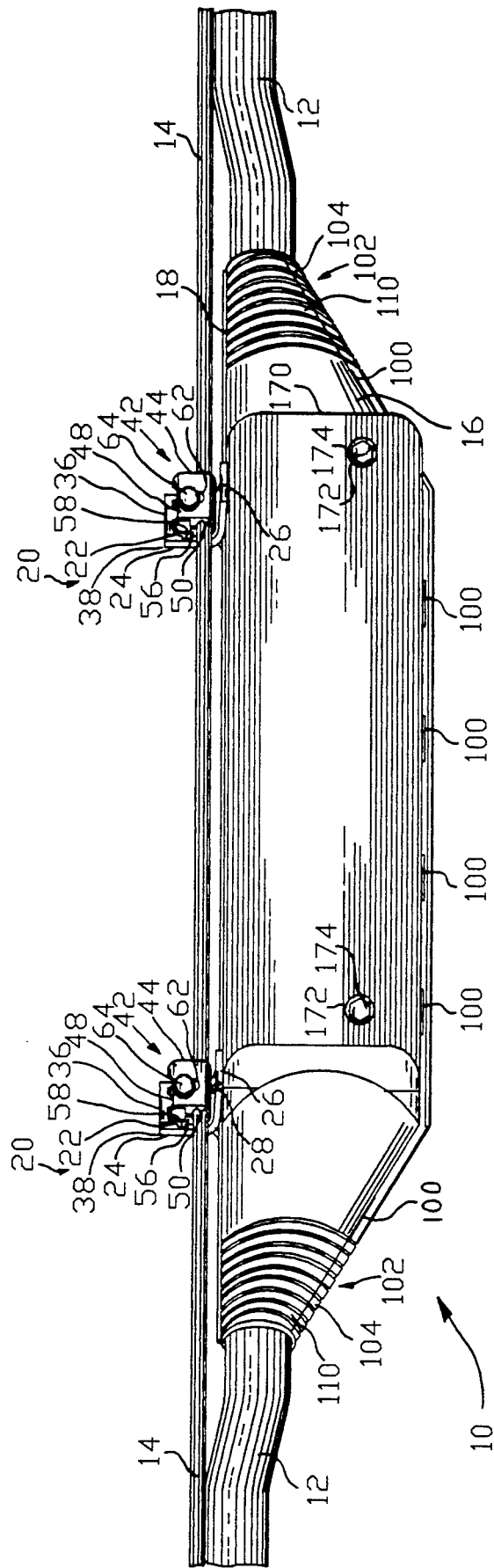
FIG. 1 is a perspective view of the novel closure when fully closed, when supported by a support strand, and when receiving a single cable of small diameter.

Referring now to FIG. 1, it will there be seen that an illustrative embodiment of the improved unitary cable closure is denoted as a whole by the reference numeral 10.

Closure 10 encloses a communications cable 12, supported by a support strand 14, and has a generally tubular main body 16 formed of two sections that are hingedly joined to one another along the top of said main body at integral hinge 18. Main body 16 may be a single-piece molding of a relatively rigid plastic such as polypropylene or polyethylene and hinge 18 may be provided in the form of a reduced-thickness section to give it the required flexibility for the hinging action. The wall thickness of the main body is about 0.125 inch (0.62 cm); thus, the closure 10 is durable and long-lasting.

Electrically conductive hanger brackets 20, 20, which are longitudinally spaced from one another as shown, are formed of two interfitting parts 22 and 24 that are complementally notched to provide a hinging action that corresponds to the hinging action of hinge 18. Each part 22, 24 has an integral arcuate base, 26, 27, respectively, (FIG. 2) that is fixedly secured to main body 16 on opposite sides of hinge 18 by metallic fastening members 28, 28. An insulated metal bar 30 (FIGS. 5-8) is positioned inside closure 10 and extends between brackets 20, 20; the fastening members 28, 28, engage said bar 30. A second metal bar 34 is disposed in parallel or oblique relation to first metal bar 30, and the two bars are interconnected by a bonding cable 32. The second insulated bar 34 provides a means for the electrical rebonding of a cable opening after the outer jacket of cable 12 has been removed and the reestablishment of its electrical continuity is required such as in the case of new cable splices or repairs. This is achieved by attachment of bar 34 to the outer jacket of cable 12 across the cable opening by any of several means well known to the art.

Interfitting hinge parts 22, 24 further include vertical parts 36, 38, (FIG. 1) formed integrally with arcuate base parts 26, 27, respectively. Each vertical part 36, 38 is centrally apertured and each aperture is internally threaded to receive a bolt, hereinafter identified.

A strand clamp 42 includes top wall 48, front wall 44, and rear wall 46, as best shown in FIG. 8. Barb 50 is formed on the rear surface of front wall 44, and a tab 52 is formed on the same rear surface, upwardly of said barb. Barb 50 forms an mechanical/electrical connection between strand clamp 42 and strand 14. Tab 52 prevents the strand from sliding upwardly within the clamp, i.e., it confines the strand 14 so that the contact between barb 50 and the strand is maintained. Another barb 54 is formed on the rear surface of the rear wall 45, and another tab 56 is formed thereabove; these parts oppose their counterparts so that strand 14 is sandwiched between diametrically opposed barbs 50, 54 and confined by diametrically opposed tabs 52, 56.

Alignment tabs 58 (FIGS. 1 and 7) are disposed in sandwiched relation between rear wall 46 and clamp 42 and the vertical part 36 of bracket 20; they are configured to prevent swiveling of clamp 42 when bolt 64 is tightened; this allows a one-handed operation by the craftsperson when working at a substantially elevated position.

A vertical slot 62 (FIGS. 1-3, 5 and 6) is formed in each wall 44, 46 of clamp 42, and a bolt 64 extends through each slot. The above-mentioned internally threaded apertures formed in vertical parts 36, 38 of brackets 20, 20, respectively, screw threadedly receive said bolts 64, 64. The vertical slots permit vertical adjustment of strand clamp 42 with respect to vertical parts 36, 38; when the clamp 42 is adjusted upwardly, the tubular main body 16 of the cable closure 10 is free to swing open along hinge 18 to a maximum extent. However, when the clamp is so positioned, strand 14 is more remote from cable 12 and the transverse pressures or moment around the strand is increased. Thus, the transverse pressures are minimized when the clamp is adjusted downwardly; this positions the strand 14 and cable closer together.

Clamp 42 further includes punched-out slots 49 formed in top wall 48 along the extent thereof. Slots 49 reduce the amount of metal required to make the clamp, as best understood in connection with FIG. 2, and reduce the tensile strength of said top wall to enable front and back walls 44, 46 thereof to converge toward one another when bolt 64 is tightened (with a minimal amount of effort) while still providing sufficient structural strength to ensure the longevity of the mechanical-/electrical connection between clamp 42 and support strand 14.

In the first embodiment, the longitudinally extended opposite edges of the main tubular body 16 are denoted 70 and 90 in FIGS. 7 and 8. When the body 16 is opened, said edges are spaced apart and access opening 72 (FIG. 7) is thereby created. Mating flanges 76, 77 are formed along said opposing edges, as are plural longitudinally spaced locking fasteners 78, 79 (FIGS. 9 and 10) which perform the function their name implies. More particularly, as shown in FIG. 10, locking fastener 78 is formed integrally with edge 70 of main body 16 and includes a first hook 82 that projects from wall 80. Wall 80 is trifurcated and includes a finger having an upwardly projecting barb 84 and an upper guard 86; hook 82, the barbed finger and upper guard 86 are the trifurcated parts of said wall 80.

Locking fastener 79 mates with locking fastener 78. Wall 94 is bifurcated and forms a second hook 92 having a barb 96 formed thereon that interlocks with barb 84 and a second lower guard 98.

First and second hooks 82, 92 are protected by upper and lower guards 88, 98, respectively when edges 70 and 90 of tubular body 16 are joined to one another.

It will be observed that once the barbs have interlocked with one another, the edges 70 and 90 cannot thereafter be swung apart from one another; thus, the interior of tubular body 16 is non-reenterable. In a second embodiment, shown in FIG. 11, barbs 84, 96 are replaced with ridges 101 and 103, respectively; this provides reentry. As those skilled in the art of injection molding will appreciate, this unitary feature is accomplished in the injection mold by making an insert change at slot 100. In this innovative molding arrangement, reenterable or non-reenterable locking fasteners are formed directly into said closure 10 during the injection molding process without the use of any further assembly.

As shown in FIG. 13, mating edges 70, 90 include integral hinging end locks 102. Edge 70 further includes a hinging hooking part 104 which engages its counterpart hinging hooking part 106 formed in opposing edge 90. Note that this particular locking mechanism is employed only in the extreme outer end sections of the novel closure, i.e., the locking mechanism in the tubular main body 16 and the inner part of each end section (shown in alternate embodiments of FIGS. 10 and 11), is different from the locking mechanism in the extreme outer ends of the closure 10, i.e., note that FIG. 13 is taken along line 13—13 in FIG. 9. FIG. 5 perhaps best discloses how the locking means of the extreme ends of the closure is different from the rest of the locking means.

A plurality of rings, collectively denoted 110 in FIG. 14, are formed in the longitudinally spaced opposite ends of closure 10; each ring has a width of about 0.125 inch (0.635 cm). An end-sealing construction, denoted 170 as a whole, FIG. 15, includes a resilient rubber insert 172 and a plurality of partition walls 174. Each wall 174 is positioned inside its associated individual ring and the outermost peripheral edge of each wall 174 is joined to the interior surface of tubular main body 16. Divider wall 173 divides insert 172 into first and second longitudinally-extending tubular cavities or chambers 176, 178 which provide effective seals that protect cable 12 from the external environment, thereby eliminating the need for further sealing materials.

Note that the first or upper tubular cavity or chamber 176 and the second or lower tubular cavity or chamber 178 are tapered, i.e., their respective diameters increase as they become remote from the outer end of the closure 10; they reach their greatest respective diameters at the inner end of insert 172. Hence they are said to have a generally frusto-conical configuration. Closure 10 may be adapted, accordingly, to accommodate larger and larger in diameter cables. Where a cable larger in diameter than cable 12 is to be housed, the ring 110 nearest the end of the closure is cut off with a knife or saw. A still larger in diameter ring requires removal of the next larger ring, and so on. As each ring 110 is removed, partition walls 174 become the end retaining walls for insert 172.

Means are also provided for accommodating multiple cable entries. Accommodation of multiple cables is required, for example, when a branch splice occurs; this requires the splicing of additional communication cable laterals, risers, and terminal stub tails. Note that the upper tubular cavity or chamber 176 has a greater extent than lower tubular cavity 178. Thus, as the first few rings 110 are cut off to handle larger cable diameters, only the upper chamber 176 will be enlarged, i.e., the lower chamber will not yet be exposed. Where a double cable entry is required, additional rings 110 are cut off until the outer end of the lower chamber 178 is exposed; said lower chamber 178 then becomes a second entry port. It can also be enlarged as needed by the further cutting of the closure at rings 110.

Further innovative features appear in FIGS. 16-47. Termination port 112 (FIG. 18-19) is provided to enable facile connection of cable 12 to a service wire of the type running to a telephone customer's house. Port 112 is formed in the side of tubular housing 16 and includes a cover plate 170. The cover plate 170 completely encloses the termination port (FIG. 16). Whenever access is required to conductors of cable 12, the cover plate 170 can be removed from the rectangular frame 114 (FIG. 17).

Still further advances in the art include a first and second terminal embodiment of the invention. The first such embodiment comprises a terminal block panel 120 (FIG. 20) which is inserted into rectangular frame 114 (FIGS. 17, 18, 20). Terminal block panel 120 has groove 117 (FIG. 24) formed therein for interfitting with frame 114; groove 117 wraps around panel compartment 121 (FIG. 24) so that when termination block panel 120 is inserted into frame 114, it tightly engages tongue 115 of frame 114 (FIG. 23) to form a weathertight seal. Frame 114 includes a drop slot 116 (FIGS. 18-21) formed along its bottom wall 118. Drop slot 116 provides a recessed area at the bottom of said frame 114 so that terminated service wires can terminate through terminal box panel 120 and through the bottom of frame 114 and so that terminal block panel can enter and exit frame 114 in the absence of service drop removal, whereby telephone service to subscribers is not interrupted. As best shown in FIGS. 23 and 24, panel 120 includes a rear wall 124 having a cylindrical projection 122 that projects forwardly therefrom. Projection 122 houses a bolt 130 and a divider wall 126 that is centrally apertured to receive said bolt 130. The bolt assembly includes washer 132, spring 134, and Timmerman nut 128 on the opposite side of divider wall 126. Spring 134 biases the head of bolt 130 away from divider wall 126 so that the bolt is properly aligned when the panel 120 is inserted in frame 114 and when it is not so inserted.

As shown in FIG. 17, an upwardly projecting wall 136 is positioned at the opposite ends of frame 114. Each wall 136 includes an internally threaded insert 138 for screw threadedly receiving bolt 130 when panel 120 is joined to frame 114. The construction of parts 136 and 138 might be better understood in connection with FIG. 23 and 24.

Terminal block panel 120 further includes a plurality of integral grommets, collectively denoted 140, (FIGS. 20 and 26) through which service wires are extended to customer's houses. Each service wire terminates within panel 120 at a binding post 142; note that the binding posts 142 are aligned as shown on a terminal block 144.

Panel 120 further includes a service drop hanger 146 at its opposite ends, each of which depends from an ear 148.

The bottom of terminal block panel 120 completely covers and seals drop slot 116 when said terminal block panel 120 is received by frame 114. This allows working service drops to be terminated through slotted grommets 140. Thus, panel 120 can be unbolted and removed from frame 114 to provide direct access to the working conductors of the cable 12 without disrupting service to the terminated service wires.

A terminal block conductor stub 149 (FIGS. 20, 21, and 24) extends through aperture 147 (FIG. 24) formed in panel 120; said stub 149 is spliced to the required telephone cable conductors.

Terminal block panel 120 further includes cover or lid 150 (FIGS. 20 and 21) which is hingedly secured thereto at hinge 152. Apertures 154 and 156 are formed in opposite ends of a top wall of cover 150, and cooperatively positioned tabs 158, 158 are formed at opposite ends of bottom wall 118 of frame 114 so that the panel may be press fittingly secured to the bottom of the frame after it has been removed therefrom by simply mating the tabs and apertures. This support of the panel 120 by frame 114 frees up the hands of the craftsman so that he or she can connect the various conductors at terminal block 144 into cable 12 through terminal block stub 149 without disrupting service to the already working service drops.

The cover 150 is pulled off frame tabs 158 when the retermination work is complete, and panel 120 is reinserted into frame 114 with cover 150 still in its open position, as shown in FIG. 26; bolts 130 are tightened to secure the panel to the frame and the cover 150 is then closed, as shown in FIG. 25, to thereby cover terminal block 144 and the service wires, not shown. The cover is held shut by being snapped onto locking tabs 160 (FIGS. 23-25) that are positioned at the lower edge of panel 120, on opposite ends thereof; this results in a weathertight seal for the contents of panel 120.

Where non-reentry is desired, a more permanent means of fastening panel 120 to frame 114 may be provided, i.e., rivets (not shown) may supplant bolts 130. Such rivets are placed through the centrally apertured divider wall 126 of terminal block panel 120 and through the threaded bore formed in insert 138 of the upwardly projecting wall 136 of frame 114. Such use of rivets prevents reentry into closure 10 through termination port 112.

The second terminal embodiment of the invention as shown in FIGS. 27 through 32 comprises a terminal block panel 180 (also shown in FIGS. 41-49) which is suspended from the closure 10. The terminal block panel 180 has an upwardly projecting flange 182 that inserts into the drop slot 116 of frame 114. The flange 182 has laterally extending edges 184 which lock the terminal block panel 180 into place. Terminal block panel 180 is formed in two sections (FIG. 48), the block compartment 186 and cover or lid 188, that are hingedly joined to one another along the bottom of terminal block panel 180 at integral hinge 181. Terminal block panel 180 may be a single-piece molding of a relatively rigid plastic such as polypropylene or polyethylene and hinge 181 may be provided in the form of a reduced-thickness section to give it the required flexibility for the hinging action. The wall thickness of the main body is about 0.125 inch (0.62 cm); thus, the terminal block panel 180 is durable and long-lasting.

The block compartment 186 includes a lip 187 (FIGS. 47 and 48) which provides a seal between the block compartment 186 and the cover 188 and mates with the inside edge of the cover 188.

The terminal block panel 180 further includes a plurality of integral grommets, collectively denoted 190 (FIGS. 41-44 and 47) through which service wires are extended to customer's houses. Each service wire terminates within panel 180 at a binding post 192; note that the binding posts 192 are aligned as shown on a terminal block 194. The panel 180 includes aperture 193 through which terminal tail 195 protrudes.

Panel 180 further includes a pair of lock down service drop hangers 196 at its opposite ends, each of which is spaced apart from slot 197 and each of which has a folded, stored position (FIGS. 41, 42, 45 and 46) and a deployed locked position (FIGS. 43, 44, 47 and 48). By pivoting each hanger 196 downward it is locked down by means of hook 198 of slot 197 which engages hanger 196, thereby providing a stationary position. This novel stationary position permits the hanger to remain in place even with the incidental pulling against it caused by wind or even craft person pulling on the service wires thereby resulting in a drop hanger means which is able to properly hold its down position and a maximum drop entrance.

Panel 180 still further includes a means to keep the cover or lid 188 situated at a 90 degrees angle thus preventing unintentional closing and permitting unobstructed access to both the terminal block 180 and the service drop wires that hang beneath panel 180. The terminal block compartment 186 includes a slot 200 (FIG. 48) along the outside lower edge below lip 187. The cover 188 includes a thin outwardly projecting finger 202 along its outside lower edge which mates with slot 200 of compartment 186 when in its closed state. When the cover is opened, finger 202 engages lip 187 as shown in FIG. 48 and prevents cover 188 from closing unless sufficient force is provided to flex the finger 202 thus permitting the finger 202 to reinsert into slot 200.

The upwardly projecting flange 182 of terminal block panel 180 seals drop slot 116. Cover plate 170 has a corresponding slot 178 (FIG. 35) which likewise seals upwardly projecting flange 182. Cover plate 170 (FIGS. 33-40) includes a pair of laterally spaced cylindrical projections 174 that project outwardly therefrom. Each projection 174 houses bolt 172 and a retainer wall that is centrally apertured to retain bolt 172 and is properly aligned with internally threaded insert 138 of wall 136. Thus, the cover plate 170 is positioned onto the frame 114 and bolts 172 are tightened to secure said cover plate 170 to said frame 114 (FIGS. 28 and 29).

The cover plate 170 can also be unbolted and removed from frame 114 (FIG. 27) to provide direct access to the working conductors of the cable 12 without disrupting service to the terminated wires terminated below in panel 180. In the event that termination of cable 12 is not required, the cover panel 170 would additionally include a drop slot displacement insert 176. (FIGS. 33-36, 39, and 40). Insert 176 can be placed into the cover panel 170 along the bottom thus sealing slot 178.

The novel closure 10 thus completely encloses, electrically bonds and grounds, seals and terminates a cable or cables 12 of differing diameters, all without requiring additional parts or components.

This invention is clearly new and useful. Moreover, it was not obvious to those of ordinary skill in the art at the time it was made, in view of the prior art when considered as a whole in accordance with the requirements of law.

It will thus be seen that the objects set forth above are efficiently attained, and although certain changes may be made in the foregoing construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A hollow housing that encloses a cable, said housing having a tubular main body part, a pair of tapered, tubular end sections disposed at opposite ends of said main body part, a hinge means formed along an uppermost edge of said main body part and said end sections, locking means formed along a lowermost edge of said main body part and end sections so that said enclosure may be swung open at said hinge when said locking means is not engaged, a plurality of transversely disposed, longitudinally spaced apart rings formed in said opposite end sections of said housing, and wherein said housing is cuttable at each of said rings so that it may thereby be adapted to accept cables of differing diameters and to accept a second cable of differing diameters as well.

2. The housing of claim 1, further comprising an end sealing device disposed within the hollow interior of each of said opposite end sections of said housing so that said opposite ends remain sealed to the external environment as said housing is cut at said rings.

3. The housing of claim 2, wherein each of said end sealing devices is an insert member of elastomeric construction and has a generally frusto-conical configuration, includes a circular outermost end wall and a plurality of circular partition walls disposed in parallel relation to said end wall, each of said partition walls being longitudinally spaced apart from one another and being positioned between said rings so that as said end sections are cut at said rings, said partition walls provide a seal that protects the hollow interior of said housing from the environment outside said housing.

4. The housing of claim 3, further comprising a longitudinally extending divider wall that divides said end sections into an upper chamber and a lower chamber so that a first cable is receivable within the upper chamber and a second cable is received within said lower chamber.

5. The housing of claim 4, wherein said upper chamber has a greater longitudinal extent than said lower chamber and wherein cutting off the outermost rings formed in said end sections enables only the upper chamber to receive a cable therein.

6. The housing of claim 1, wherein said housing is produced by injection molding, wherein said locking means for said housing is provided in reenterable form by adding an appropriate insert means into a mold at the time the housing is produced.

7. A hollow housing that encloses a cable, said housing having a tubular main boy part, a pair of tapered, tubular end sections disposed at opposite ends of said main body part, a hinge means formed along an uppermost edge of said main body part and said end sections, locking means formed along a lowermost edge of said main body part and end sections so that said enclosure may be swung open at said hinge when said locking means is not engaged, a termination port formed in a preselected sidewall of said tubular main body, a frame member positioned in said termination port, a terminal block panel having a parallelepiped construction and wherein a plurality of service wire-receiving grommets are positioned in a bottom wall of said block panel so that plural service wires can pass therethrough, and wherein said housing further includes a longitudinally-extending slot formed along a bottom edge of said termination port so that a seal is formed when said terminal block panel is inserted and so that working service wires enter and exit said termination port while remaining connected through said grommets to a terminal block located in said terminal block panel which also enters and exits said termination port, means for releasably securing said terminal block panel to said frame member, a cover that is hingedly mounted to said block panel, and releasable attachment means for releasably securing said cover to said frame member so that said terminal block panel may be suspended from said frame member through said cover.

8. The housing of claim 7 further comprising a pair of frame tabs that depend from opposite ends of said frame member and further comprising a pair of cooperatively configured, dimensioned and positioned openings formed in a top wall of said cover, whereby said cover and hence said panel block is suspended from said frame member by interconnecting said frame tabs, and said cover openings.

9. The housing of claim 8, further comprising an opening formed in a back wall of said terminal block panel, and further comprising an elongate flexible terminal block stub that interconnects a cable housed with said housing with said terminal block panel, said stub passing through said back wall opening.

10. The housing of claim 9, wherein said means for releasably securing said terminal block panel to said frame member include a pair of bolt members disposed at opposite, longitudinally spaced ends of said terminal block panel and a pair of bolt-receiving inserts cooperatively positioned at opposite ends of said frame member.

11. The housing of claim 10, further comprising retaining means for retaining said bolt members in attached relation to said terminal block panel even when said panel is removed from said frame member.

12. The housing of claim 11, wherein said retaining means includes a tubular sleeve member associated with each of said bolt members, a divider wall positioned in said sleeve member, said divider wall being internally threaded to screw threadedly engage said bolt member, and a bias means positioned between a head of said bolt and said divider wall.

13. The housing of claim 12, further comprising a pair of service drop hangers, said hangers disposed in depending relation from opposite ends of said terminal block panel.

14. An improved unitary cable closure, comprising:
a hollow housing having a tubular main body part;
a pair of tapered, tubular end sections disposed at opposite ends of said main body part;
a hinge means formed along an uppermost edge of said main body part and said end sections;
locking means found along a lowermost edge of said main body part and said end sections;
a termination port formed in said tubular main body;
a frame member positioned in said termination port;
a terminal block panel;
said frame members slideably receiving said terminal block panel;
a lid hingedly connected to said terminal block panel along a top wall of said terminal block panel; and
means for releasably suspending said lid from said frame member so that said terminal block panel is suspended from said frame member when said lid is open and when said lid is suspended from said frame member.

15. The cable closure of claim 14, wherein said means for releasably suspending said lid from said frame member, includes a pair of tabs formed in a bottom wall of said frame member, and a cooperatively aligned pair of apertures formed in a top wall of said lid, said apertures press jittingly receiving said tabs to releasably suspend said lid from said frame member.

16. The cable closure of claim 15 further comprising a drop slot formed in said bottom wall of said frame member, said top wall of said lid being received within said drop slot when said apertures press jittingly receive said tabs.

17. The cable closure of claim 14, further comprising a groove formed in said terminal block panel and a mating tongue formed in said frame member, said groove receiving said tongue, when said frame member slideably receives said terminal block panel to form a weathertight seal between said frame member and said terminal block panel.

18. The cable closure of claim 14, further comprising a pair of drop hangers hingedly secured to a bottom wall of said terminal block panel, said drop hangers having a deployed position where they are disposed normal to said bottom wall of said terminal block panel, and having a stored position where they are folded to overlie said bottom wall of said terminal block panel.

19. The cable closure of claim 18, further comprising means for maintaining said drop hangers in their deployed position so that they are not folded inadvertently into their stored position.

20. The cable closure of claim 14, further comprising a flat cover plate for closing said termination port.

21. An improved unitary cable closure, comprising:
a hollow housing having a tubular main body part;
a hinge means formed along an uppermost edge of said main body part;

locking means formed along a lowermost edge of said main body part;

a termination port formed in said tubular main body;

said termination port including a frame member that projects outwardly therefrom;

a terminal block panel having a top wall and a bottom wall;

a lid for selectively closing said terminal block panel, said lid being hingedly secured to said bottom wall; and means for releasably suspending said terminal block panel from said frame member.

22. The cable closure of claim 21, wherein said means for releasably suspending said terminal block panel from said frame member includes an upwardly projecting-flange formed in said top wall of said terminal block panel, said flange including a pair of laterally extending edges formed in its opposite ends.

23. The cable closure of claim 22, further comprising a drop slot formed in said frame member, and wherein said means for releasably suspending said terminal block panel from said frame member includes engagement of said upwardly projecting-flanges within said drop slot.

24. The cable closure of claim 23, where said terminal block panel includes a block compartment and said lid, and further comprising a lip formed in said block compartment, said lip mating with an inside edge of said lid to provide a weathertight seal.

25. The cable closure of claim 24, further comprising a flat cover plate for closing said termination port.

26. The cable closure of claim 25, further comprising a pair of drop hangers hingedly secured to a bottom wall.

27. The cable closure of claim 21, wherein said lid is positioned normal to said terminal block panel when said lid is open, and further comprising means for maintaining said lid in said open position so that said lid cannot be closed inadvertently.

28. The cable closure of claim 27, wherein said means for maintaining said lid open includes a flexible finger formed in said lid and a finger receiving slot formed in said terminal block panel, said finger entering said slot only when driven thereinto by intentional closing of said lid.

* * * * *